K. W. BARTLETT.
APPARATUS FOR TREATING LIQUIDS.
APPLICATION FILED MAR. 31, 1909.
947,783.
Patented Feb. 1, 1910.
2 SHEETS—SHEET 1.
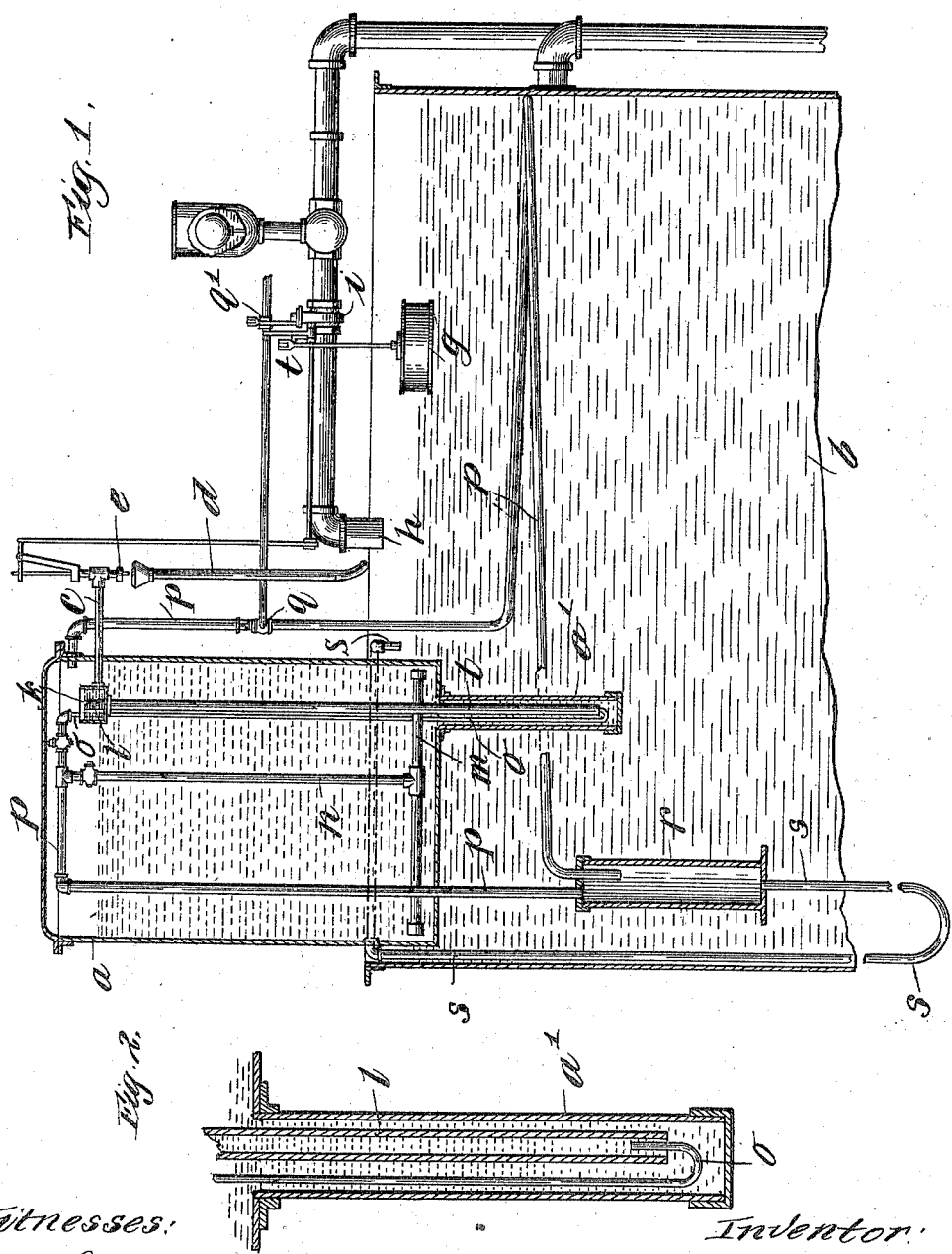
Witnesses:
G. W. Paulenschmidt
L. F. Stroh
Inventor:
Kent W. Bartlett
By G. L. Gregg
Atty

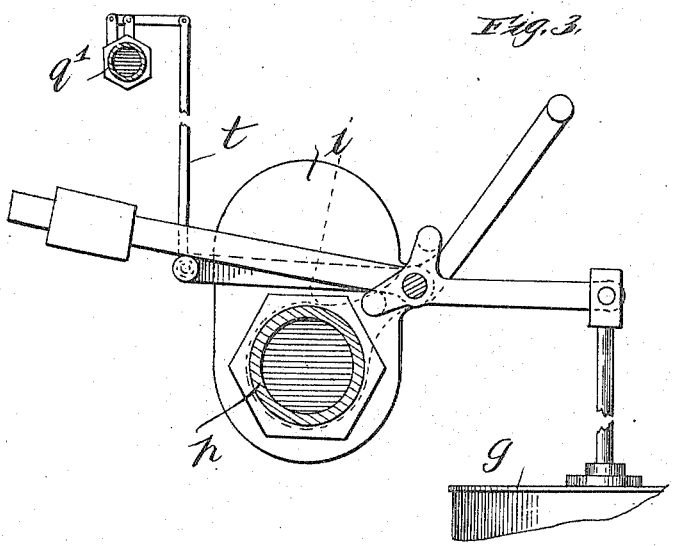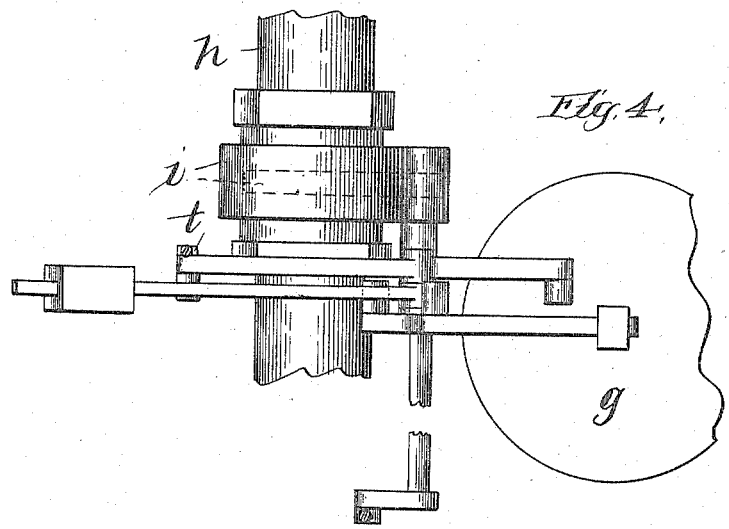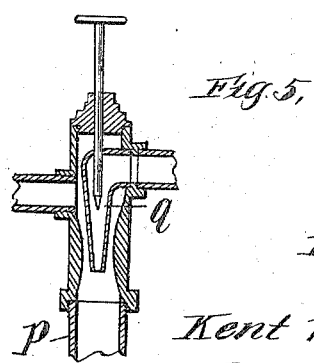

UNITED STATES PATENT OFFICE.

KENT W. BARTLETT, OF MADISON, WISCONSIN.

APPARATUS FOR TREATING LIQUIDS.

947,783.  Specification of Letters Patent.  Patented Feb. 1, 1910.

Application filed March 31, 1909. Serial No. 487,012.

*To all whom it may concern:*

Be it known that I, KENT W. BARTLETT, a citizen of the United States, residing at Madison, in the county of Dane and State of Wisconsin, have invented a certain new and useful Improvement in Apparatus for Treating Liquids, of which the following is a full, clear, concise, and exact description, reference being had to the accompanying drawings, forming a part of this specification.

My invention relates to an apparatus for chemically treating liquids, and has for one of its objects the provision of an improved means for effecting the application of air to the chemical, preferably for both agitating the chemical and forcing the discharge thereof, which means preferably serves to cause the air to flow under pressure as a consequence of the admission of steam to an air pipe the flow of water of condensation through the air pipe being preferably arrested so that it will not enter the chemical and disturb the proper proportioning thereof. The air thus caused to flow under pressure is also desirably employed to effect the flow of chemical from the chemical tank, a portion of the air being caused to rise through a tube projecting into the chemical tank, whereby the chemical is caused to flow through the tube since the column of combined air and chemical within the tube is lighter than the surrounding chemical, which latter, as a consequence, forces the column of air and chemical within the tube upwardly. I preferably use the same air or gas over and over again, so as to prevent the influx of fresh air into the chemical which would be likely to be deteriorated or modified by the air, particularly if milk of lime is used in the treatment of water.

My invention will be described in connection with the accompanying drawing, showing the preferred form of apparatus.

In the drawings—Figure 1 is a diagrammatic view of the apparatus of my invention, parts being shown in section and parts being shown in elevation. Fig. 2 is a detail view of a part of the structure shown in Fig. 1. Fig. 3 shows mechanism for controlling admission of steam to the apparatus of my invention. Fig. 4 is a plan view of a part of the structure shown in Fig. 3. Fig. 5 is a detail view of a steam valve entering into the construction.

Like parts are indicated by similar characters of reference throughout the different figures.

The chemical tank $a$ is located above the setting tank $b$ and is provided with a discharge pipe or outlet $c$ through which chemical is passed into the down-take pipe $d$ leading to the settling tank. A valve structure $e$ is located in the outlet $c$ and is so governed by a float $g$ that when the float reaches a predetermined upper level, the valve is closed, and when the float reaches a predetermined lower level, the valve is opened, the construction being one that is now well known to those skilled in the art. The float $g$ also governs the admission of water to the tank $b$ through an in-take pipe $h$, said float so governing a valve $i$ in said intake pipe that water is permitted to flow into the tank $b$ when the float reaches a predetermined lower level, the valve being operated by the float when the float reaches a predetermined upper level to cut off the flow of water. The mechanism intervening between the float $g$ and the valves $e$ and $i$ is desirably such that said valves are not altered in position during the time the float is moving from one to the other of its alternative positions, said valves being opened only when the float reaches its lower level and being closed only when the float reaches its upper level. The chemical is desirably not taken directly from the tank $a$, but is first preferably passed from said tank into a discharge chamber $k$ through a chemical pipe $l$ leading through the bottom of said chamber and extending sufficiently above the outlet $c$ to cause the pressure and volume of chemical flowing through said outlet to be constant.

The chemical within the tank $a$ is desirably agitated by means of a forced draft of air and is desirably caused to pass from the tank $a$ to the chamber $k$ through the action of air that is caused to rise through the pipe $l$, my invention relating in particular to these characteristics which will now be described. A pipe $m$ extends along the bottom of the tank $a$, this pipe being perforated along its under side and closed at its ends, whereby air forced into the middle thereof through the air pipe $n$ will impinge upon the chemical and agitate the same so as to maintain the proper chemical mixture. Another air pipe $o$ extends downwardly along the pipe $l$ and is upturned at its lower end so as to extend for a slight distance into the pipe $l$ near the bottom thereof, the chamber $a$ being provided with an extension $a'$ for receiving the lower portions of the pipes $l$ and $o$, the extension $a'$ being provided in order that a column of chemical, extraneous to the pipes, of sufficient height, may be provided, in order to overbalance the column of intermixed chemical and air in pipe $l$. The air entering the pipe $l$ from the pipe $o$ causes the column of liquid chemical within the pipe $l$ to be lighter than the liquid chemical surrounding the pipe, whereby the liquid chemical is caused to rise within the pipe $l$ a sufficient distance above the outlet $c$ for the purpose of causing the chemical to flow through said outlet in unvarying volume under unvarying pressure, thereby causing the chemical that is to be admitted to the settling tank to be proportional to the water that is admitted to the settling tank, which, when flowing through the pipe $h$, comes into the settling tank in unvarying volume under unvarying pressure. The air pipes $n$ and $o$ are in common connection with an air pipe $p$ through which air is forced by some suitable agency, preferably that agency forming another feature of my invention now to be described. The air pipe $p$ is provided, in accordance with my invention, with a steam inlet $q$ designed to admit steam under boiler pressure into the pipe $p$ to force the flow of air under sufficient pressure through said pipe, in order sufficiently to supply the pipes $m$ $n$ and $o$ with air for the purposes which have been described.

The air is forced downwardly through the pipe $p$ from the steam inlet $q$, a portion of the pipe being coiled in the settling tank, so that the steam may be surely condensed after it has performed its function, the water of condensation being caught in an enlargement $r$ of the pipe $p$, this enlargement $r$ constituting a water trap. The pipe $p$ continues upwardly from the enlargement $r$ so as to convey the air, now free of water, into the pipes $m$ $n$ and $o$, for the purposes which have been stated. By freeing the air that is jetted into the chemical through the pipes $m$ and $o$ of the water of condensation, it is obvious that the strength of the chemical is not altered, a very important object to be gained where air is forced into the chemical in the manner described, for the purpose of agitating the same and causing the flow thereof into the settling tank. The water which is trapped in the enlargement $r$, finds passage through the pipe $s$ into the settling tank, and is therefore not wasted.

The chemical which I preferably employ for treating the water is milk of lime $Ca(OH)_2$. If the air were freely taken from the external atmosphere and passed through this chemical, the chemical would be carbonated, or partially so, a reaction taking place which may be expressed by the formula $$Ca(OH)_2 + CO_2 = CaCO_3 + H_2O.$$

I prevent this result from taking place by removing the pipe $p$ from connection with the external air, this result being secured by sufficiently sealing the chemical tank $a$, and connecting the intake end of the pipe $p$ (that end of the pipe immediately above the steam in-let $q$) with the air space at the top of the chemical tank, so that the air that is forced through the pipe $p$ by the steam is taken from and returned to the air space at the top of the chemical tank and is not taken from the external atmosphere nor returned to the external atmosphere. There is thus a constant body of air (or gas) which is used over and over again for the mechanical purposes of agitating the chemical and causing the discharge thereof through the chemical outlet. If desired, the steam may be intermittently supplied to the pipe $p$ so as to force the flow of air through the pipe when the liquid in the settling or receiving tank has reached a predetermined lower level and to cut off the flow of air when the liquid in the settling or receiving tank has reached a predetermined upper level, for which purpose the float $g$ may through the mechanism $t$, control the main steam valve at $q'$ governing the flow of steam to inlet $q$ to open the valve when the float has reached its lower limiting level, and to close the valve when the float has reached its upper limiting level.

While I have herein shown and particularly described my invention as applied to a settling tank having a float therein to govern the different valve devices, I do not wish to be limited to the precise construction or type of apparatus illustrated, as changes may readily be made without departing from the spirit of my invention.

Having thus described my invention, I claim as new and desire to secure by Letters Patent the following:—

1. A liquid treating apparatus including a receiving tank, a chemical tank, means whereby chemical is supplied to the receiving tank from the chemical tank, means for guiding air or gas from the chemical tank and returning the same to the chemical tank, and means for forcing said air or gas through the guiding means, which guiding means also serves to direct the forced gas into the chemical to agitate the same and which guiding means and chemical tank are separated from the external air to prevent the unrestricted influx of external air through the chemical.

2. A liquid treating apparatus including a receiving tank, a chemical tank, means whereby chemical is supplied to the receiving tank from the chemical tank, a chemical pipe extending downwardly into the chemical tank, a second pipe for directing air or gas into said chemical pipe to cause the column of gas and chemical in the chemical pipe to be overbalanced by the chemical outside of the chemical pipe, and thereby causing the rise of the chemical in the chemical pipe, said second pipe being out of communication with the external atmosphere to prevent the unrestricted influx of external air thereby through the chemical.

3. A liquid treating apparatus including a receiving tank, a chemical tank, means whereby chemical is supplied to the receiving tank from the chemical tank, a chemical pipe extending downwardly into the chemical tank, and a second pipe for directing air or gas into said chemical pipe to cause the column of gas and chemical in the chemical pipe to be overbalanced by the chemical outside of the chemical pipe, and thereby causing the rise of the chemical in the chemical pipe.

4. A liquid treating apparatus including a receiving tank, a chemical tank, means whereby chemical is supplied to the receiving tank from the chemical tank, piping for guiding air or gas from the chemical tank and returning the same to the chemical tank, and means for directing a jet of steam into said piping for forcing said air or gas through the piping, which piping also serves to direct the forced gas into the chemical to agitate the same and which piping and chemical tank are separated from the external air to prevent the unrestricted influx of external air through the chemical.

5. A liquid treating apparatus including a receiving tank, a chemical tank, means whereby chemical is supplied to the receiving tank from the chemical tank, a chemical pipe extending downwardly into the chemical tank, a second pipe, and means for directing a jet of steam into said second pipe for forcing air or gas into said chemical pipe to cause the column of gas and chemical in the chemical pipe to be overbalanced by the chemical outside of the chemical pipe, and thereby causing the rise of the chemical in the chemical pipe, the second pipe being out of communication with the external atmosphere to prevent the unrestricted influx of external air thereby through the chemical.

6. A liquid treating apparatus including a receiving tank, a chemical tank, means whereby chemical is supplied to the receiving tank from the chemical tank, a chemical pipe extending downwardly into the chemical tank, a second pipe, and means for directing a jet of steam into the latter pipe for forcing air or gas into said chemical pipe to cause the column of gas and chemical in the chemical pipe to be overbalanced by the chemical outside of the chemical pipe, and thereby causing the rise of the chemical in the chemical pipe.

7. A liquid treating apparatus including a receiving tank, a chemical tank, means whereby chemical is supplied to the receiving tank from the chemical tank, piping for guiding air or gas from the chemical tank and returning the same to the chemical tank, means for directing a jet of steam into said piping for forcing said air or gas through the piping, which piping also serves to direct the forced gas into the chemical to agitate the same and which piping and chemical tank are separated from the external air to prevent the unrestricted influx of external air through the chemical, and means for separating the water of condensation from the gas before the gas is returned to the chemical tank.

8. A liquid treating apparatus including a receiving tank, a chemical tank, means whereby chemical is supplied to the receiving tank from the chemical tank, a chemical pipe extending downwardly into the chemical tank, a second pipe, means for directing a jet of steam into the latter pipe for forcing air or gas into said chemical pipe to cause the column of gas and chemical in the chemical pipe to be overbalanced by the chemical outside of the chemical pipe, and thereby causing the rise of the chemical in the chemical pipe, the second pipe being out of communication with the external atmosphere to prevent thereby the unrestricted influx of external air through the chemical, and means for separating the water of condensation from the gas before the gas is returned to the second pipe.

9. A liquid treating apparatus including a receiving tank, a chemical tank, means whereby chemical is supplied to the receiving tank from the chemical tank, a chemical pipe extending downwardly into the chemical tank, a second pipe, means for directing a jet of steam into the latter pipe for forcing air or gas into said chemical pipe to cause the column of gas and chemical in the chemical pipe to be overbalanced by the chemical outside of the chemical pipe, and thereby causing the rise of the chemical in the chemical pipe, and means for separating the water of condensation from the gas before the gas is passed to the second pipe.

10. A liquid treating apparatus including a receiving tank, a chemical tank, means whereby chemical is supplied to the receiving tank from the chemical tank, piping for guiding air or gas to the chemical tank, means for directing a jet of steam into said piping for forcing said air or gas through the piping, which piping also serves to direct the forced gas into the chemical to agitate the same, and means for separating the water of condensation from the gas before the gas is passed into the chemical tank.

11. A liquid treating apparatus including a receiving tank, a chemical tank, means whereby chemical is supplied to the receiving tank from the chemical tank, a chemical pipe extending downwardly into the chemical tank, a second pipe for directing air or gas into said chemical pipe to cause the column of gas and chemical in the chemical pipe to be overbalanced by the chemical outside of the chemical pipe, and thereby causing the rise of the chemical in the chemical pipe, said second pipe being out of communication with the external atmosphere to prevent the unrestricted influx of external air thereby through the chemical, and means governed by the liquid to be treated for controlling the flow of gas through the chemical pipe.

12. A liquid treating apparatus including a receiving tank, a chemical tank, means whereby chemical is supplied to the receiving tank from the chemical tank, a chemical pipe extending downwardly into the chemical tank, a second pipe for directing air or gas into said chemical pipe to cause the column of gas and chemical in the chemical pipe to be overbalanced by the chemical outside of the chemical pipe, and thereby causing the rise of the chemical in the chemical pipe, and means governed by the liquid to be treated for controlling the flow of gas through the chemical pipe.

13. A liquid treating apparatus including a receiving tank, a chemical tank, means whereby chemical is supplied to the receiving tank from the chemical tank, a chemical pipe extending downwardly into the chemical tank, a second pipe, means for directing a jet of steam into said second pipe for forcing air or gas into said chemical pipe to cause the column of gas and chemical in the chemical pipe to be overbalanced by the chemical outside of the chemical pipe, and thereby causing the rise of the chemical in the chemical pipe, the second pipe being out of communication with the external atmosphere to prevent the unrestricted influx of external air thereby through the chemical, and means governed by the liquid to be treated for controlling the flow of gas through the chemical pipe.

14. A liquid treating apparatus including a receiving tank, a chemical tank, means whereby chemical is supplied to the receiving tank from the chemical tank, a chemical pipe extending downwardly into the chemical tank, a second pipe, means for directing a jet of steam into the latter pipe for forcing air or gas into said chemical pipe to cause the column of gas and chemical in the chemical pipe to be overbalanced by the chemical outside of the chemical pipe, and thereby causing the rise of the chemical in the chemical pipe, and means governed by the liquid to be treated for controlling the flow of gas through the chemical pipe.

15. A liquid treating apparatus including a receiving tank, a chemical tank, means whereby chemical is supplied to the receiving tank from the chemical tank, a chemical pipe extending downwardly into the chemical tank, a second pipe, means for directing a jet of steam into the latter pipe for forcing air or gas into said chemical pipe to cause the column of gas and chemical in the chemical pipe to be overbalanced by the chemical outside of the chemical pipe, and thereby causing the rise of the chemical in the chemical pipe, the second pipe being out of communication with the external atmosphere to prevent thereby the unrestricted influx of external air through the chemical, means for separating the water of condensation from the gas before the gas is returned to the second pipe, and means governed by the liquid to be treated for controlling the flow of gas through the chemical pipe.

16. A liquid treating apparatus including a receiving tank, a chemical tank, means whereby chemical is supplied to the receiving tank from the chemical tank, a chemical pipe extending downwardly into the chemical tank, a second pipe, means for directing a jet of steam into the latter pipe for forcing air or gas into said chemical pipe to cause the column of gas and chemical in the chemical pipe to be overbalanced by the chemical outside of the chemical pipe, and thereby causing the rise of the chemical in the chemical pipe, means for separating the water of condensation from the gas before the gas is passed to the second pipe, and means governed by the liquid to be treated for controlling the flow of gas through the chemical pipe.

17. A liquid treating apparatus including a liquid-receiving tank, means for supplying liquid to said tank when sufficiently empty, and for cutting off the flow of liquid to said tank when sufficiently full, a chemical tank, means whereby chemical is supplied to the liquid in the receiving tank from the chemical tank, means for directing air or gas into the chemical for agitating the same, and means governing the flow of gas into the chemical, and, in turn, governed by the liquid to be treated to cut off the flow of gas when no liquid is flowing into the tank, and for permitting the flow of gas when liquid is flowing into the tank.

In witness whereof, I hereunto subscribe my name this 19th day of March A. D., 1909.

KENT W. BARTLETT.

Witnesses:
G. L. CROGG,
L. G. STROH.